United States Patent [19]

Brakebill

[11] 4,218,040

[45] Aug. 19, 1980

[54] VALVE POSITIONER AND METHOD OF MAKING SAME

[75] Inventor: Harold G. Brakebill, Concord, Tenn.

[73] Assignee: Robertshaw Controls Company, Richmond, Va.

[21] Appl. No.: 941,464

[22] Filed: Sep. 12, 1978

[51] Int. Cl.[2] .................... F16K 31/12; F02M 25/06

[52] U.S. Cl. .................... 251/28; 123/568

[58] Field of Search .............. 251/28, 29; 123/119 A; 251/61.5; 91/461

[56] References Cited

U.S. PATENT DOCUMENTS

| | | | |
|---|---|---|---|
| 2,077,515 | 4/1937 | Campbell | 251/29 |
| 2,879,783 | 3/1959 | Taplin | 251/28 |
| 3,739,797 | 6/1973 | Caldwell | 123/119 A |
| 3,796,049 | 3/1974 | Hayashi | 123/119 A |
| 3,834,366 | 9/1974 | Kingsbury | 123/119 A |
| 3,974,807 | 8/1976 | Nohira et al. | 123/119 A |
| 4,047,510 | 9/1977 | Nakajima et al. | 123/119 A |
| 4,056,083 | 11/1977 | Wakita | 123/119 A |
| 4,099,539 | 7/1978 | Brakebill | 137/84 |
| 4,143,850 | 3/1979 | Brakebill | 251/28 |
| 4,149,501 | 4/1979 | Gropp | 123/119 A |

*Primary Examiner*—Alan Cohan

*Assistant Examiner*—A. Michael Chambers

*Attorney, Agent, or Firm*—Candor, Candor & Tassone

[57] ABSTRACT

A self-contained valve positioner having a single valve positioner housing including an actuator portion having a pneumatically operated actuator unit therein carrying a main valve member to position the main valve member relative to a main valve seat in a valve unit in relation to the magnitudes of first and second pneumatic signals directed to the valve positioner and one of which is being utilized as the fluid source therein for pneumatically operating the actuator unit, the single valve positioner housing including a pilot valve portion having a pilot valve relay disposed therein that initially receives the pneumatic signals and causes the one signal to operate the actuator unit in a manner to progressively open the valve member as the first signal being directed to the value positioner progressively increases from a first value to a second value and thereafter to progressively close the valve member as the first signal being directed to the valve positioner progressively increases from the second value to a third value. The pilot value relay sets the second and third values in relation to the magnitude of the second signal being directed to the value positioner.

5 Claims, 2 Drawing Figures

VALVE POSITIONER AND METHOD OF MAKING SAME

BACKGROUND OF THE INVENTION

1. Field of the Invention

This invention relates to an improved pneumatically operated valve positioner and to a method of making the same.

2. Prior Art Statement

It was known to applicant to provide a vacuum operated valve positioner for positioning a valve member relative to a valve seat in relation to the magnitude of a pneumatic signal directed to the positioner.

It was also known to applicant that engine control systems for internal combustion engines have been provided wherein each has an exhaust gas recirculation valve for taking part of the exhaust gas of the internal combustion engine and diverting the same into the intake manifold to be again utilized in the internal combustion engine for polution control purposes. However, the degree of exhaust gas recirculation must be regulated according to various engine parameters, such as the RPM speed of the engine, the value of the manifold absolute pressure, etc., and it was suggested by others that it would be desirable to provide such a control system wherein the exhaust gas recirculation valve is pressure operated and pneumatically operated control means is provided for increasing a pressure signal from the engine air pump pressure supply to the valve as the engine RPM speed increases from a first value to a second value and for thereafter decreasing the pressure signal from the supply to the valve as the engine RPM speed further increases from the second value thereof to a third value, the control means producing the signal in substantially the same manner but at different values for different levels of vacuum at the manifold vacuum source thereof.

Thus, applicant previously invented such a control system and device as described and claimed in the copending patent application, Ser. No. 800,211, filed May 25, 1977, now U.S. Pat. No. 4,099,539, to control the operation of a pressure operated valve positioner as set forth in applicant's other copending patent application, Ser. No. 800,299, filed May 25, 1977, now U.S. Pat. No. 4,143,850.

However, it was subsequently suggested to applicant that it was desired to have such an exhaust gas recirculation valve be regulated only according to one engine parameter, namely, the value of the manifold absolute pressure and it was further suggested that manifold vacuum operate part of the valve positioner and that carburetor port vacuum operate another part of the valve positioner so that both parts would cooperate together to produce the desired operation.

Therefore, rather than use the above suggested two separate pneumatic sources, applicant invented a pneumatically operated valve positioner that operates only in response to one pneumatic signal source and which will function for the above purpose, such valve positioner using double diaphragms and being disclosed and claimed in the copending patent application, Ser. No. 908,209 filed May 22, 1978.

Another invention of applicant also provides a single signal valve positioner and such valve positioner utilizes a relay means in the actuator unit thereof and is disclosed and claimed in the copending patent application, Ser. No. 908,537, filed May 22, 1978.

Subsequently, it was suggested to applicant that it would be desirable to modify the double diaphragm valve positioner of above Ser. No. 908,209 so that a pressure signal from the engine air supply pump could be utilized to set the limits or values of operation of the valve positioner that is operated by the manifold absolute pressure.

Therefore, rather than modify the double diaphragm valve positioner of above Ser. No. 908,209, applicant has invented a pneumatically operated valve positioner of the relay type of above Ser. No. 908,537 to include means for having a signal from the engine pressure supply means set the values or limits of operation of the valve positioner that is operated by the engine manifold absolute pressure.

SUMMARY OF THE INVENTION

It is a feature of this invention to provide a valve positioner that will progressively open a valve member relative to its valve seat as a first pneumatic signal to the valve positioner increases from a first value to a second value and thereafter will progressively close the valve member relative to its valve seat as the first pneumatic signal to the valve positioner progressively increases from that second value to a third value thereof, the valve positioner having means that sets the second and third values in relation to the magnitude of a second pneumatic signal.

In particular, such a valve positioner is adapted to be an exhaust gas recirculation valve unit for an internal combustion engine wherein the first pneumatic signal being directed thereto is taken from the vacuum manifold of the engine so that as the vacuum value changes from a first value thereof to a second value thereof, the valve unit progressively opens to direct engine exhaust gas back to the engine at a rate in relation to the vacuum value at the vacuum manifold. However, as the vacuum value changes from that second value thereof to a third value thereof, the valve member of the valve unit will progressively close toward its valve seat to reduce the rate of exhaust gas recirculation to the engine for the reasons fully set forth in the aforementioned copending U.S. patent applications. The valve positioner has means that sets the second and third values in relation to the magnitude of the pressure signal produced by the engine air pump pressure supply means.

Thus, one embodiment of this invention provides a self-contained valve positioner having a single valve positioner housing including an actuator portion having a pneumatically operated actuator means therein carrying a main valve member to position the main valve member relative to a main valve seat in a valve unit in relation to the magnitudes of first and second pneumatic signals directed to the valve positioner and one of which is being utilized as the fluid source therein for pneumatically operating the actuator means, the single valve positioner housing including a pilot valve portion having a pilot valve relay means disposed therein to initially receive the pneumatic signals and cause the one signal to operate the actuator means in a manner to progressively open the valve member as the first signal progressively increases from a first value to a second value and thereafter to progressively close the valve member as the first signal being directed to the valve positioner progressively increases from the second value to a third value. The pilot valve relay means has means that sets the second and third values in relation to the magnitude of the second signal being directed to the valve positioner.

Accordingly, it is an object of this invention to provide an improved valve positioner having one or more of the novel features of this invention as set forth above or hereinafter shown or described.

Another object of this invention is to provide a method of making such a valve positioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
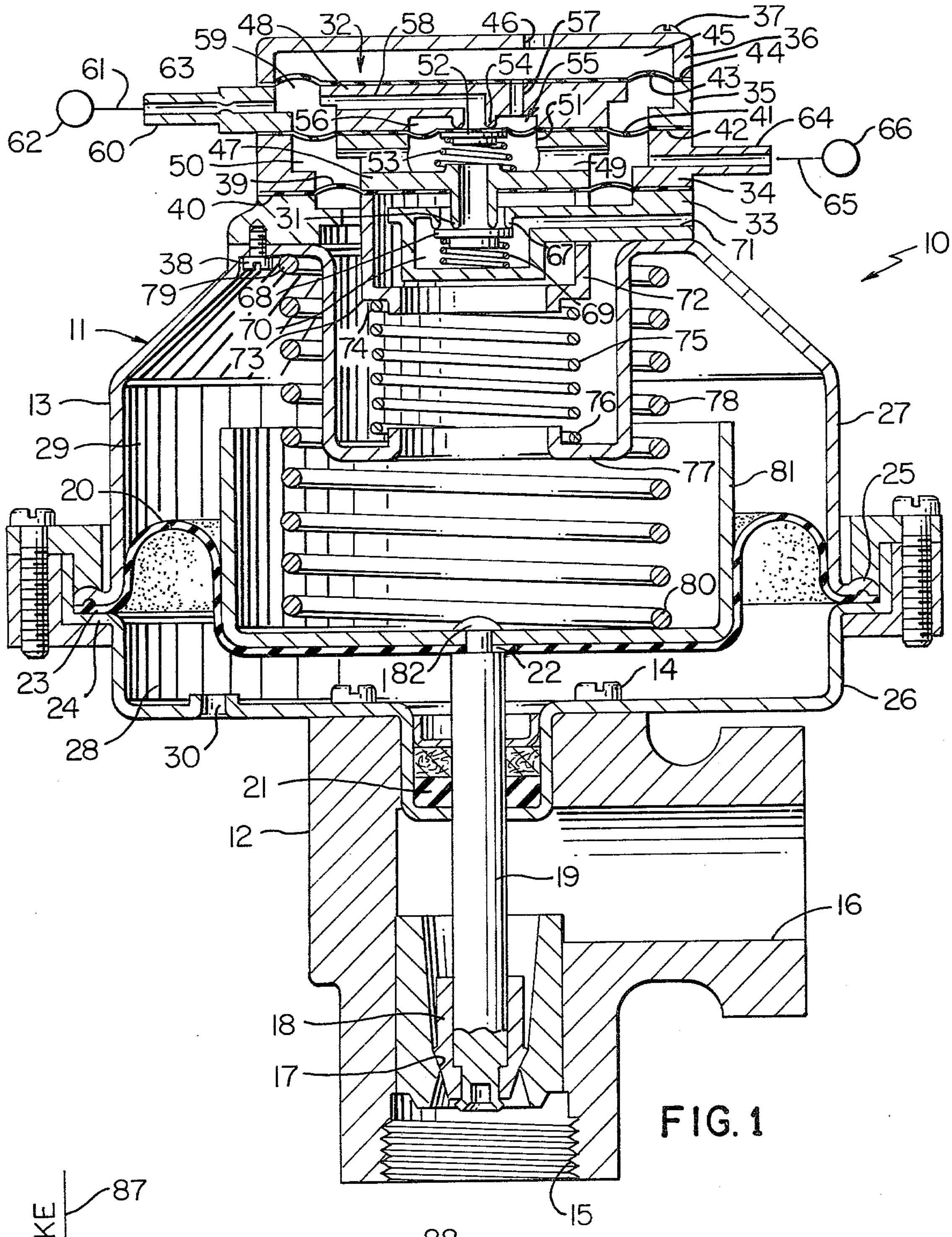
FIG. 1 is a cross-sectional view illustrating the improved valve positioner of this invention.

While the various features of this invention are hereinafter described and illustrated as being particularly adapted to provide a valve positioner to be utilized as an exhaust gas recirculation valve means for an internal combustion engine, it is to be understood that the various features of this invention can be utilized singly or in any combination thereof to provide a valve positioner for other devices as desired.

Therefore, this invention is not to be limited to only the embodiment illustrated in the drawings, because the drawings are merely utilized to illustrate one of the wide variety of uses of this invention.

Referring now to FIG. 1, the improved valve positioner of this invention is generally indicated by the reference numeral 10 and comprises a housing means 11 formed from a valve unit 12 and a pneumatically operated actuator unit 13 suitably secured together, such as by fastening means 14.

The valve unit 12 has an inlet 15 separated from an outlet 16 by a frusto-conical valve seat 17 adapted to be opened and closed by a main valve member 18 carried by a valve stem or actuator rod 19 that is secured to a flexible diaphragm 20 of the actuator unit 13 so that opening and closing movement of the valve member 18 relative to the valve seat 17 is determined by the position of the diaphragm 20 in the actuator unit 13 in a manner hereinafter set forth, the valve stem 19 passing through suitable seal means 21 carried by the valve unit 12.

The flexible diaphragm 20 has its inner periphery 22 secured to the valve stem 19 and its outer periphery 23 clamped between the outer peripheral portions 24 and 25 of a pair of cup-shaped housing members 26 and 27 that define part of the housing means for the actuating unit 13 whereby the diaphragm 20 cooperates with the housing part 26 to define a chamber 28 therebetween and cooperates with the housing part 27 to define a chamber 29 therebetween.

The chamber 28 is adapted to be interconnected to the atmosphere by an opening 30 formed in the housing part 26 while the chamber 29 is adapted to be disposed in fluid communication with a valve seat 31 of a relay means that is generally indicated by the reference numeral 32 and form part of the actuator means or unit 13.

In particular, the relay means 32 comprises a plurality of housing parts 33, 34, 35 and 36 disposed in stacked relation and being secured together by suitable fastening means 37 with the housing stack 33–36 itself being secured to the cupshaped housing member 27 of the unit 13 by suitable fastening means 38.

A flexible diaphragm 39 has its outer periphery 40 held between the housing members 33 and 34. Another flexible diaphragm 41 has its outer periphery 42 held between the housing parts 34 and 35 while a third flexible diaphragm 43 has its outer periphery 44 held between the housing parts 35 and 36 whereby the diaphragm 39 cooperates with the cup-shaped housing member 27 to define part of the chamber 29 therein and the other outboard diaphragm 43 cooperates with the housing part 36 to define a chamber 45 that is adapted to be interconnected to the atmosphere by a vent port 46 in the housing part 36.

A pair of spacers 47 and 48 form part of the relay means 32 with the spacer 47 being secured to and disposed between the diaphragms 39 and 41 while the spacer 48 is secured to and disposed between the diaphragms 41 and 43 as illustrated whereby the spacers 47 and 48 move with the diaphragms 39–43 as a stack as will be apparent hereinafter.

The spacer 47 of the relay means 32 carries the valve seat 31 that leads to an internal passage 49 of the spacer 47, the passage 49 communicating with the chamber or space 50 disposed between the diaphragms 39 and 41 as well as to an opening 51 in the spacer 47 that is closed by the intermediate portion of the diaphragm 41 extending across the same as illustrated in FIG. 1.

A disc-like valve member 52 is disposed in the passage 49 of the spacer 47 and is urged by a compression spring 53 against the diaphragm 41 to tend to urge diaphragm 41 to close against a valve seat 54 of the spacer 48 that is disposed in aligned relation with the opening 51 of the spacer 47 whereby the valve member 52 and valve seat 54 define a relief valve means that is generally indicated by the reference numeral 55 for a purpose hereinafter described.

The space 56 in the relay means 32 surrounding the valve seat 54 is interconnected to the chamber 45 of the relay means 32 by a passage 57 in the spacer 48 as illustrated so that when the valve seat 54 is opened, the valve seat 54 will be interconnected to the atmosphere by means of the interconnected spacing 56, passage 57, chamber 45 and vent 46 for a purpose hereinafter described.

The spacer 48 has an internal passage 58 that leads from the valve seat 54 to the chamber or spacing 59 disposed between the diaphragms 41 and 43.

The relay means 32 has a nipple extension 60 disposed in fluid communication with the spacing 59 between the diaphragms 41 and 43 and is adapted to be interconnected by suitable passage means 61 to a signal source 62 which, in the embodiment illustrated in the drawings, comprises the air pump of an internal combustion engine which provides an air pressure supply means for the transportation vehicle that contains such engine. The nipple extension 60 has a restriction 63 therein for a purpose hereinafter described.

Another nipple extension 64 is carried by the housing part 34 and is disposed in fluid communication with the chamber 50 disposed between the diaphragms 39 and 41, the nipple extension 64 being adapted to be interconnected by suitable conduit means 65 to another signal source 66 which, in the embodiment illustrated in the drawings, comprises the vacuum manifold for the internal combustion engine of the transportation vehicle utilizing the valve positioner 10 of this invention as an exhaust gas recirculation valve for a purpose hereinafter described.

The valve seat 31 of the spacer 47 projects loosely into a surrounding valve seat part 67 of the housing part 33 and is adapted to engage against a valve member 68 urged toward the valve seat 31 by a compression spring 69, the valve member 68 also being adapted to close the valve seat 67 when disposed thereagainst for a purpose hereinafter described.

The valve seat 67 of the housing part 33 is interconnected to an internal chamber 70 of the housing part 33 that contains the valve member 68 and spring 69 with chamber 70 being adapted to be interconnected to the atmosphere by a valve opening 71 in the housing part 33.

The relay means has a spring retainer 72 carried by the spacer 47 and extending beyond the housing part 33 to define a shoulder 73 against which one end 74 of a compression spring 75 bears while the other end 76 of the compression spring 75 bears against a shoulder 77 formed from the cup-shaped housing member 27 as illustrated whereby the force of the compression spring 75 tends to move the stack of spacers 47 and 48 of the relay means 32 upwardly in the drawings and thereby move the valve seat 31 away from the valve member 68 to interconnect the chamber 50 to the main chamber 29 of the valve positioner 10 for a purpose hereinafter described. However, when the spacers 47 and 48 move downwardly in opposition to the force of the compression spring 75 to cause the valve seat 31 to be closed by the valve member 68 and the valve member 68 to be moved downwardly therewith away from the valve seat 67, the atmosphere 71 is adapted to be interconnected through the now opened valve seat 67 to the main chamber 29 of the valve positioner 10 for a purpose hereinafter described.

A compression spring 78 is disposed in the chamber 29 of the actuator unit 13 and has one end 79 bearing against the cup-shaped housing member 27 while the other end 80 thereof bears against a diaphragm cup 81 secured against the main flexible diaphragm 20 by a rivet-like end 82 of the valve stem 19 as illustrated whereby the force of the spring 78 tends to close the valve member 18 against the valve seat 17.

From the above, it can be seen that the valve positioner 10 of this invention can be formed by the method of this invention in a simple manner to provide a self-contained unit adapted to operate in a manner now to be described.

As previously stated, the valve positioner 10 can be utilized as an exhaust gas recirculation valve means for an internal combustion engine of a transportation vehicle or the like and the chamber 59 of the relay 32 can be interconnected to the air pump pressure supply means 62 of such engine while the chamber 50 of the relay means can be interconnected to the vacuum manifold 66 of the same internal combustion engine.

The exhaust gas from the internal combustion engine is adapted to be interconnected to the inlet 15 of the main valve unit 12 while the outlet 16 of the main valve unit 12 is adapted to be interconnected to the intake manifold of the internal combustion engine so that when the valve member 18 is disposed in an open condition relative to the valve seat 17, a certain amount of the exhaust gas from the internal combustion engine is now adapted to be returned to the intake manifold thereof to be recycled through the engine for polution control purposes and the like.

In any event, before the engine is started, the chamber 29 of the actuator unit 13 is at atmospheric condition and the force of the compression spring 78 maintains the valve member 18 fully seated against the valve seat 17 to initially prevent any exhaust gas from being recirculated back to the intake manifold.

Also, initially, with both the air pump supply means 62 and manifold 66 of the internal combustion engine respectively producing zero air pressure and zero vacuum, the force of the compression spring 75 has moved the stack of spacers 47 and 48 of the relay means 32 upwardly in FIG. 1 so that the valve member 68 is closed against the valve seat 67 and the valve seat 31 is open to the chamber 29 whereby the vacuum manifold 66 is adapted to be interconnected to the chamber 29.

However, once the engine is initially started, the vacuum value in the manifold 66 begins to increase and the full vacuum thereof is interconnected to the chamber 29 of the actuator unit 13 to begin to evacuate the chamber 29 whereby the resulting pressure differential acting across the diaphragm 20 tends to pull the diaphragm 20 upwardly in opposition to the force of the compression spring 78 and thereby opens the valve member 18 relative to the valve seat 17.

At a certain vacuum value in the chamber 29, such as between 1 inch and 5 inches Hg, the valve member 18 has been moved to the maximum open position thereof relative to the valve seat 17 so that full flow of exhaust gas at the inlet 15 is passed through the valve unit 12 to the outlet 16 thereof that leads to the intake manifold of the internal combustion engine for the reasons previously set forth.

Figure 2:
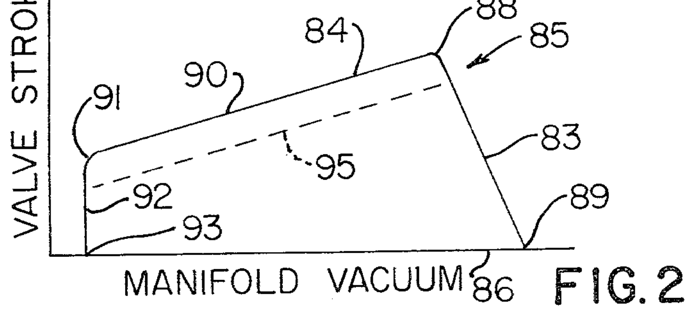
FIG. 2 is a graph illustrating the valve stroke operation of the valve positioner of FIG. 1 as the vacuum signal thereto increases through a certain range thereof.

Such valve stroke of the valve member 18 is illustrated by the portion 83 of a full line 84 on a graph 85 of FIG. 2 where the X axis 86 represents manifold vacuum value as the same increases in inches of mercury from left to right and the Y axis 87 represents the opening stroke of the valve member 18 relative to the valve seat 17 in increasing percent of the full opening thereof from the bottom of the Y axis to the top thereof. Thus, the full line 84 of FIG. 2 represents the movement of the valve member 18 relative to the valve seat 17 during the operation of valve positioner 10 of this invention whereby when the air supply pressure 62 of the internal combustion engine is delivering pressure of the approximately 10 inches Hg, the valve member 18 has reached the fully open position represented by the point 88 on the graph 85 when the vacuum value of the manifold has reached 5 inches Hg.

Thus, it can be seen that when the valve member 18 is initially closed, the point 89 of the line 84 represents the initial closed valve member 18 and the portion 83 of the line 84 represents the valve member 18 being opened initially as the vacuum in the chamber 29 begins to increase from zero inches to approximately 1 to 5 inches Hg and if the air pump 62 is supplying approximately 10 inches of pressure at this time into the chamber 59 of the relay means 32, it can be seen that such pressure in the chamber 59 by acting on the different sized diaphragms 41 and 43 has a net effect to tend to urge the diaphragm 43 upwardly and assist the compression spring 75 in maintaining the valve seat 31 in a fully open condition to continue to interconnect the vacuum source 66 to the chamber 29.

However, at a combination of approximately 10 inches of pressure in the chamber 59 of the relay means 32 and a vacuum value of approximately 1 inch to 5 inches Hg in the chamber 29 of the actuator unit 13, a further increase in vacuum value in the chamber 29 causes the pressure differential acting across the diaphragm 39, which has the atmosphere on the upper side thereof and the vacuum on the lower side thereof, to tend to move the diaphragm 39 downwardly and pull the stack of spacers 47 and 48 therewith in opposition not only to the force of the compression spring 75, but also in opposition to the net effect force of the pressure fluid in the chamber 59 acting on the diaphragm 43 and tending to move the stack 47, 48 upwardly.

With such a pressure of 10 inches in the chamber 59 and approximately 1 to 5 inches Hg vacuum value in the chamber 29, the relay means 32 is in force balance in that the valve seat 31 is disposed against the valve member 68 while the valve member 68 is also being closed against the valve seat 67.

As the internal combustion engine continues to run, the vacuum valve being created in the vacuum manifold 66 increases and thereby increases the vacuum value in the chamber 50 of the relay means 32 so that resulting pressure differential acting across the different sized diaphragms 39 and 41 has a net effect to pull the spacer stack 47, 48 further downwardly in opposition to the force of the compression spring 75 and move the valve member 68 in unison with the valve seat 33 away from the valve seat 67 to now bleed air from the vent 71 into the chamber 29 and thereby progressively reduce the vacuum value therein as the vacuum value in the chamber 50 progressively increase. This reduction of the vacuum value in the chamber 29 permits the compression spring 78 to now move the valve member 18 downwardly toward the valve seat 17 to begin to progressively close the same as represented by the portion 90 of the line 84 in the graph 85 of FIG. 2.

When the vacuum value of the vacuum manifold 66 reaches a certain value, such as represented by the point 91 on the line 84 of the graph 85 as being approximately 16 inches Hg, the pressure differential across the intermediate portion of the diaphragm 41 that closes the valve seat 54, is such that the same moves the valve member 52 away from the valve seat 54 so that the valve seat 54 is now interconnected to the atmosphere 46 to dump the pressure fluid in the chamber 59 to the atmosphere. In this manner, the pressure in the chamber 59 can not build back up as previously because of the restriction 63 in the nipple 60 permitting the pressure in the chamber 59 to fully vent to the atmosphere whereby the pump 62 can not build up the pressure in the chamber 59 beyond the atmosphereic level thereof.

With the chamber 59 now at atmospheric condition, the air pressure that had continued to urge the diaphragm 43 upwardly is now lost so that the resulting forces on the diaphragm stack of spacers 47, 48 cause the stack 47, 48 to be moved downwardly to fully open the valve seat 67 and rapidly dump the remaining vacuum value in the chamber 29 to the atmosphere so that the force of the compression spring 78 immediately closes the valve member 18 against the valve seat 17 as represented by the portion 92 of the line 84 of the graph 85 of FIG. 2.

Thus, it can be seen that when the vacuum value at the manifold 66 reaches the point 91 on the line 84 of the graph 85, the valve stroke falls immediately to the closed condition thereof as represented by the point 93 on the graph 85 which occurs when the vacuum value of the manifold 66 reaches approximately 16 inches Hg.

The previously described operation of the valve positioner 10 was based on the fact that the air pressure supply 62 delivers approximately 10 inches of pressure force during the operation. However, it may be found that the air pressure supply 62 only produces 8 inches of pressure during such time whereby the portion 90 of the line 84 will be represented by the dashed line 95 on the graph 85 because the force acting the diaphragm 43 to assist the compression spring 75 in maintaining the valve member 31 in an open condition from the valve member 68 will be reduced from the 10 inch pressure in the chamber 59 to the 8 inch pressure whereby it can be seen that for other values of the air pressure from the air pressure pump 62 below 10 inches, the points 88 and 91 of the line 84 of the graph 85 will be changed to lower values thereof, but will be linear therebetween.

Thus, it can be seen that the valve positioner 10 of this invention has a pneumatically operated actuator means 13 carrying a main valve member 18 to position the main valve member 18 relative to a main valve seat 17 in a valve unit 12 in relation to the magnitudes of pneumatic signals 66 and 62 directed to the actuator means 13. The actuator means 13 has relay means 32 to cause the actuator means 13 to progressively open the valve member 18 (as represented by the portion 83 of the line 84 of the graph 85) as the first signal 66 progressively increases from a first value 89 to a second value 88 and thereafter to progressively close the valve member 18 (as represented by the portion 90 of the line 84 of the graph 85) as the first signal 66 progressively increases from the second value 88 to a third value 91. The relay means 32 has means 41, 43 and 59 that sets the first and second values 88 and 91 in relation to the magnitude of the second signal 62.

This is accomplished by the relay means 32 being a force balance relay means as previously described.

Thus, this invention not only provides a valve positioner that is adapted to control the exhaust gas recirculation valve means of an internal combustion engine in a manner believed optimum to the operation of such engine as represented by the graph 85 of FIG. 2, but also this invention provides a method of making such a valve positioner or the like.

While the form and method of this invention, now preferred, have been illustrated and described as required by the Patent Statute, it is to be understood that other forms and methods can be utilized and still fall within the scope of the appended claims.

What is claimed is:

1. In a self-contained valve positioner having a single valve positioner housing including an actuator portion having a pneumatically operated actuator means therein carrying a main valve member to position said main valve member relative to a main valve seat in a valve unit in relation to the magnitudes of first and second pneumatic signals directed to said valve positioner and one of which is being utilized as the fluid source therein for pneumatically operating said actuator means, the improvement wherein said actuator means including a main flexible diaphragm means operatively interconnected to said main valve member, a first chamber formed between said main flexible diaphragm means and a second flexible diaphragm means, said first chamber in communication with either atmosphere through a first port means in said housing or said second pneumatic signal through a second port means in said second diaphragm means in response to the position of a first pilot valve means, wherein said second pneumatic signal is in communication with said first chamber when said first pilot valve means closes said first port means and opens said second port means to said second pneumatic signal, said first pilot valve means responsive to a second pilot valve means, a second chamber formed between said second diaphragm means and a third diaphragm means and including a third port means open to atmosphere in response to the position of said second pilot valve means, said second pilot valve means responsive to said first pneumatic signal to open said third port means to atmosphere, said first pilot valve means responsive to said second pilot valve means opening said third port means to open said second port means and close said first port means, wherein said second pneumatic signal communicates with said first chamber to bias said valve member to an open position against a biasing means biasing said valve member to a closed position.

2. A valve positioner as set forth in claim 1, wherein said biasing means includes a first compression spring disposed in said first chamber and having opposed ends, one of said opposed ends of said first spring bearing against said housing and the other of said ends acting on said main diaphragm.

3. A valve positioner as set forth in claim 2 and including a second compression spring disposed in said first chamber and having opposed ends, one of said opposed ends of said second spring bearing against said housing and the other of said ends thereof acting on said second diaphragm means.

4. A valve positioner as set forth in claim 1, wherein said third diaphragm means is larger in area than said second diaphragm means wherein said valve member progressively opens as said first pneumatic signal increases from a first value to a second value and thereafter closes as said first pneumatic signal progressively increases from said second value to a third value.

5. A valve positioner as set forth in claim 1 wherein said first pneumatic signal is a pressure source and said second pneumatic signal is a vacuum source.

* * * * *